United States Patent [19]

Shinoi et al.

[11] 3,860,756

[45] Jan. 14, 1975

[54] AUTOMATIC VOICE-PATH SWITCHING CIRCUIT FOR A SPEAKER PHONE TELEPHONE SET

[75] Inventors: Tsuyoshi Shinoi; Toyoshige Murakami, both of Kawasaki, Japan

[73] Assignees: Nippon Tsu Shin Kogyo K.K., Kawasaki-shi, Japan; TIE/Communications Inc., Stamford, Conn.

[22] Filed: Mar. 23, 1973

[21] Appl. No.: 344,218

[52] U.S. Cl. .............................. 179/1 HF, 179/81 B

[51] Int. Cl. ............................................ H04m 9/08

[58] Field of Search...... 179/1 CN, 1 H, 1 HF, 81 B

[56] References Cited

UNITED STATES PATENTS

| | | | |
|---|---|---|---|
| 3,046,354 | 7/1962 | Clemency | 179/81 B |
| 3,075,045 | 1/1963 | Clemency | 179/81 B |
| 3,146,313 | 8/1964 | Ulin | 179/81 B |
| 3,291,911 | 12/1966 | McCullough | 179/1 H |
| 3,330,912 | 7/1967 | Koseki | 179/1 VC |
| 3,372,239 | 3/1968 | Clement | 179/81 B |
| 3,461,240 | 8/1969 | Lindgren | 179/81 B |
| 3,725,585 | 4/1973 | Moniak | 179/81 B |

*Primary Examiner*—Thomas W. Brown
*Attorney, Agent, or Firm*—Kenyon & Kenyon Reilly Carr & Chapin

[57] ABSTRACT

A key telephone set incorporating a microphone and loudspeaker for hands-free telecommunication includes a circuit responsive to the difference between transmitted and received signal levels for switching the telephone set from transmitting to receiving mode and back again.

4 Claims, 3 Drawing Figures

AUTOMATIC VOICE-PATH SWITCHING CIRCUIT FOR A SPEAKER PHONE TELEPHONE SET

BACKGROUND OF THE INVENTION

The invention relates generally to voice switching circuits for use in telephone sets equipped with a microphone and speaker, (hereinafter called a "speaker phone"). The invention relates particularly to key telephone speaker phones.

In conventional speaker phones, that is, those which permit voice transmission and reception by microphones and speakers without the use of a handset, a frequently encountered problem is acoustic feedback or howling through the microphone and speaker circuits. One conventional solution is to install a voice signal switch in the transmitting-receiving system, and to limit acoustical coupling between microphone and speaker by means of minimum physical separation thereof when microphone and speaker housed in different units, or by installation of acoustical insulation therebetween when both are housed in the same unit. This, however, introduces the problem of chopping or clipping of voice signals, when the speaker phone is switched between transmitting and receiving modes.

Moreover, because of the rapid advances in electronics technology and the development of integrated circuit devices, a consumer demand for miniaturization of speaker phones has been created. In order to meet this demand, it is necessary to eliminate the mechanical restrictions placed on conventional speaker phones.

SUMMARY OF THE INVENTION

It is, therefore, an object of the present invention to provide a speaker phone in which the microphone and speaker are mounted in a common housing.

It is a further object of the invention to provide a novel transistorized voice-path switching circuit for use in such speaker phone, which may be fabricated by conventional integrated circuit techniques.

In accordance with the invention, an automatic voice-path switching circuit for a telephone set equipped with a microphone and speaker comprises, in combination, means, which are responsive to the difference in signal levels between voice signals transmitted from and received at the telephone set, for deriving a control signal representative thereof. The circuit additionally includes switching means, connected to the respective inputs of amplifier means in the transmitting and receiving voice signal paths of the telephone set, for alternately connecting and disconnecting the microphone and the speaker from the office line to which the telephone set is connected in response to the variations of the derived control signal with respect to a reference voltage.

DETAILED DESCRIPTION OF THE PREFERRED EMBODIMENTS

Figure 1:
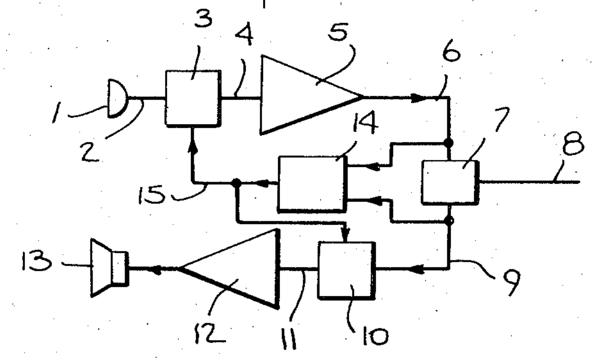
FIG. 1 is a block diagram of a speaker phone which incorporates an automatic voice-path switching circuit constructed in accordance with the present invention.

Referring to FIG. 1, sound enters a speaker phone through microphone 1, and is converted to an electrical signal, which passes through line 2 and a transmitting switch circuit means 3. This voice-representative signal is then amplified by transmitting amplifier 5, and after passing through hybrid coil 7 is sent to the connected subscriber over line 8. The voice-representative signal received at the speaker phone from the other subscriber talking on line 8 is fed from the hybrid coil 7 to receiving switch circuit means 10. This signal is coupled to the input of receiving amplifier 12, which drives speaker 13.

In accordance with the invention, the operation of circuits 3, 10 switches the speaker phone back and forth from the transmitting and receiving modes. Automatic control of the circuits 3, 10 is accomplished by a level comparison circuit means 14, which compares the magnitude of the voice signal transmitted on line 6 with the magnitude of the voice signal received on line 9. The control signal derived from this comparison, a magnitude difference-representative signal, is amplified, and coupled on line 15 to the respective inputs of switch circuit means 3 and 10. When the transmitted signal is greater in magnitude than the received signal, circuit means 3 operates to couple the local user's voice signal to amplifier 5, and circuit means 10 blocks the received voice signal from amplifier 12. However, when the received signal magnitude is greater than the magnitude of the signal to be transmitted, the received voice signal is coupled to amplifier 12 by circuit means 10. At the same time, circuit means 3 blocks the generated voice signal from amplifier 5.

In general, the voice signal of the first party to talk determines the speaker phone's mode, i.e., transmitting or receiving; the mode is not changed unless the other party speaks louder, or until the first party stops talking. With the circuit arrangement used herein, however, if transmitting switch circuit means 3 is not normally in a predetermined state of partial conduction, no transmitted signal would ever appear on line 6, and it would be impossible to switch the speaker phone to a transmitting mode by means of a voice signal generated at the speaker phone. The automatic voice-path switching circuit of the present invention is one that gives an ideal switching characteristic with a stable condition of partial transmission, during a condition of no voice signal generation or reception, that is, when the speaker phone is idle. This permits the circuit to switch to a fully transmitting condition.

Figure 2:
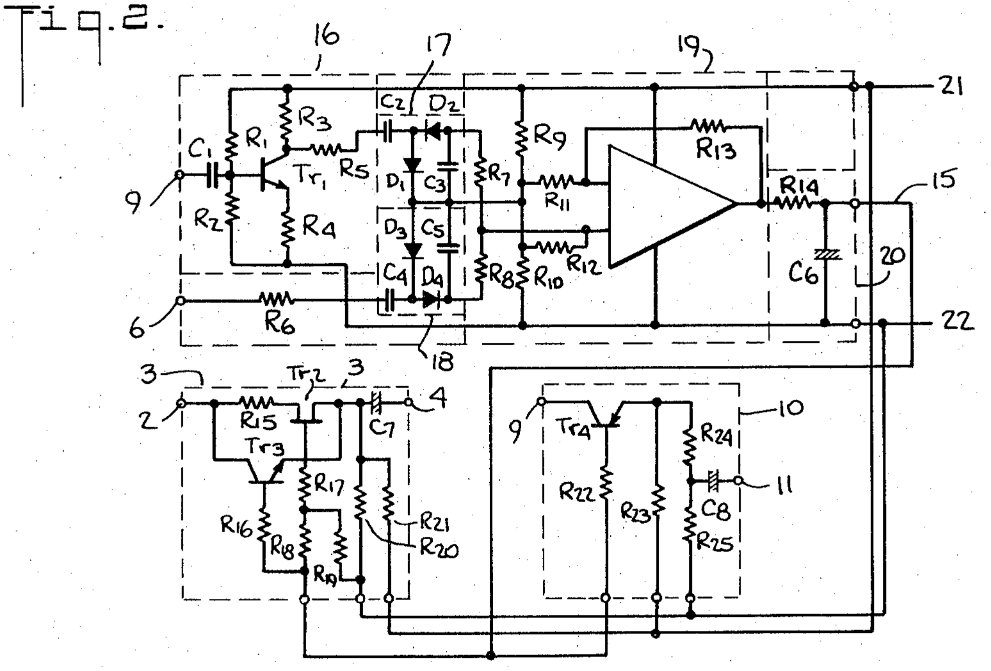
FIG. 2 is an electrical schematic of one embodiment of an automatic voice-path switching circuit constructed in accordance with the invention.

Referring to FIG. 2, the circuit details of one embodiment of the present invention are shown. In particular, the level comparison circuit means 14 comprises an auxiliary voice-receiving amplifier means 16, a voice-receiving rectifier circuit means 17, a voice-transmitting rectifier circuit means 18, a high gain d-c amplifier circuit means 19 and time constant circuit 20. In combination, these circuits derive a control signal which is coupled on line 15 to the inputs of switch circuit means 3 and 10.

In particular, the voice signal output of amplifier 5 is coupled by resistor R6 to recitifier circuit means 18, which comprises coupling capacitor C4, diodes $D_3$, $D_4$, and output capacitor C5. The received voice signal from line 8 is coupled by capacitor C1 to amplifier means 16, which comprises transistor TR1 and resistors R1, R2, R3, R4, R5. The output of amplifier means 16 is coupled to rectifier means 17, which includes coupling capacitor C2, diodes D1, D2 and output capacitor C3.

In operation, the rectified positive half-cycles of the voice signal generated at the speaker phone, and the negative half-cycles of the received voice signal are added together in the resistance network comprising resistors R7, R8, R9, R10, R11, R12. A signal representative of the difference in magnitude between the generated and received voice signals is thereby obtained, and is amplified by a high gain d-c amplifier means 19, which includes a feedback resistor R13. This amplified signal is then coupled as a control signal from an R-C network, resistor R14 and capacitor C6, to the switch circuit means 3, 10.

In accordance with the invention, transmitting switch circuit means 3 comprises parallel switching circuit branches, which have different switching thresholds and different conduction, or on-state, losses. These branches comprise first, a depletion type N channel field effect transistor TR2, having a resistor 15 connected in series therewith, and second, a bipolar NPN transistor TR3, which shunts transistor TR2 and resistor R15. Receiving switch circuit means 10 comprises a PNP transistor TR4.

In further accordance with the invention, the drain and emitter of transistors TR2 and TR3, respectively, and the emitter of transistor TR4 are connected to a predetermined reference voltage. The control signal developed by the level comparison circuit 14 is subtracted from this reference voltage. In general, when the difference is negative, both transistors TR2 and TR3 conduct, and a voice signal transmission path between terminals 2, 4 of switch circuit 3 is established. At the same time, transistor TR4 is cut-off by this sum representative voltage, so that the voice signal transmission path between terminals 9, 11 of switch circuit means 10 is opened. The opposite results obtain when the sum of control and reference voltages is positive.

In one embodiment, the reference voltage is predetermined at a value equal to one-half of the power source voltage applied between terminals 21, 22 (FIG. 2). This voltage is obtained in the transmitting switch circuit 3 by means of a voltage dividing network comprising resistors $R_{20}$, $R_{21}$, and in the receiving switch circuit 10 by means of a voltage dividing network comprising resistors 23, 24, 25.

Figure 3:
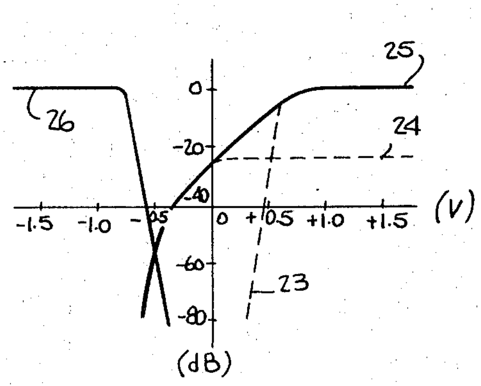
FIG. 3 is a graph showing the transmission loss in decibels, as a function of the difference in voltage between the control signal and the reference voltage, of the transmitting and receiving switching means incorporated in the apparatus shown in FIGS. 1, 2.

In further accordance with the invention, the transmission characteristics of resistor R15 and transistor TR2 on the one hand, and transistor TR3 on the other, are predetermined so that transistor TR2 is in the conductive state and transistor TR3 is off when voice signal is neither being transmitted or received. These characteristics are shown in FIG. 3. The abscissae show the difference signal voltage values obtained by subtracting the comparison circuit control voltage from the reference voltage, and the ordinates show the transmission losses through the transmitting switch circuit 3 (curve 25, which is the sum of curves 23, 24, the transmission losses of the transistor TR3 circuit branch, and of the transistor TR2 and resistor R15 circuit branch, respectively), and the receiving switch circuit 10 (curve 26). The switch circuits 3, 10 are so proportioned that at the point where the difference voltage is 0 volts, transistors TR3 and TR4 are both off, and transistor TR2 is on.

In this condition, the transmission characteristic of transmitting switch circuit 3 is equal to the transmission characteristic of the circuit branch comprising transistor TR2 and resistor R15, which is the ratio of output voltage at terminal 4 to input voltage at terminal 2 (Vo/Vi):

$$V_o/V_i = (R_{20}\,R_{21})/[R_{15}\,(R_{20} + R_{21}) - R_{20}\,R_{21}]$$

By appropriate selection of resistor values, the d-c potentials of the drain of transistor TR2 and the emitter of transistor TR3 are held at one-half the voltage of the power source. Hence, the amount of signal attenuation through the transmitting switch circuit means 3, at the point where the difference voltage (V) is zero, can be calculated. By appropriate selection of components, this loss is predetermined at −26db, a value at which the switch circuit 3 can be operated by locally generated voice signals, but not ambient noise.

Thus, the actual transmitting-receiving transition switching point, that is, the point at which transistor TR4 starts to conduct and transistor TR2 begins to go off, is at a point a little lower than the value of the preselected reference voltage.

When the speaker phone is idle, the output of level comparison circuit means 14 is in the no signal state, and is stabilized at the reference voltage. The transmitting switch circuit 3 introduces at −26dB loss, and the receiving switch circuit 10 introduces at its maximum loss. Any ambient noise picked up through the microphone 1 is attenuated by 26 dB before being transmitted on line 8. Because of this 26 dB attenuation compared to the normal transmitting state, this noise level is equivalent to that picked up by the handset of a telephone.

In this condition, when voice sound enters the microphone, the generated voice signal is also attenuated by 26 db, and is transmitted by the transmitting amplifier 5 and hybrid coil 7 to the line 8. At the same time, the voice signal output of amplifier 5 is fed as an input signal to the signal rectifying circuit 18 of level comparison circuit means 14, and a positive d-c voltage is thereby generated. The output of high gain d-c amplifier 19 then becomes more positive than the reference voltage. Because this amplified d-c signal is applied to the switch circuit means 3 and 10 by the same time constant circuit $R_{14}$, $C_6$, the switch circuit means 10 remains in a state of maximum loss.

However, transistor TR3 is biased into conduction; the collector-emitter circuit of transistor TR3 then short circuits the transmission path through resistor R15 and transistor TR2. The amount of attenuation through the transmitting switch circuit means 3 then decreases to zero, and voice transmission is sent at maximum output from hybrid coil 7 to the line 8. Moreover, there is no unnaturalness of conversation during the time period that the switch circuit means 3 transmission loss goes from −26 dB to zero dB. Since there is only an attenuation loss on the order of 26 dB introduced at the very beginning of the conversation, chopping or clipping is avoided. Even if the conversation is begun in a low voice, the first part of the conversation is not cut-off. This is a particularly important advantage of the automatic voice-path switching circuit constructed in accordance with the present invention.

When an incoming voice signal is received on line 8, it is coupled to the receiving switch circuit means 10 and the auxiliary receiving amplifier 16 of the level comparison circuit means 14. The negative-going half-cycles of the amplified voice signal are rectified by rectifying circuit means 17. This d-c signal is added to the output of the transmitting rectifying circuit means 18, which as described above rectifies the positive-going half-cycles of the transmitted signal, and the sum-representative signal is applied to the d-c amplifier 19, and is coupled via the time constant circuit $R_{14}$, $C_4$ to the transmitting and receiving switch circuit means 3, 10.

If the incoming voice signal is higher in level than the outgoing voice signal, the control voltage applied to switch circuit means 3, 10, becomes more negative than the reference voltage. Transistors TR2 and TR3 are thereby cut-off, and the transmitting switch circuit means 3 then goes into a maximum loss condition. At the same time, transistor TR4 is biased into conduction, and the receiving switch circuit means 10 insertion loss decreases to zero. The incoming voice signal is then coupled by switch means 10 to the receiving amplifier 12 and drives speaker 13; on the other hand, the switch means 3 blocks transmission of voice signals from the microphone to amplifier 5. The switching time for this transmit-to-receive transition is determined by the difference in levels of the signal inputs to the comparison circuit means 14. In the idle state, for example, the mircophone signals produced by any ambient noise are attenuated 26 dB, while the received signal path is coupled without attenuation to the comparison circuit. If a signal is received, the difference in these two levels will be large and the circuit will switch quickly to the receiving state. Further, since in the receiving state transmitting switch circuit means 3 is completely cut off, signals generated by the microphone in response to sounds from the speaker due to acoustic coupling will not reach the comparison circuit means 14, and therefore unlike prior apparatus, false voice switching cannot occur, and the received signal can be reproduced at the desired acoustic level without regard to the proximity of the microphone.

When a voice-path switching circuit is used in the speaker phone, it is impossible to have completely simultaneous coversation, but naturalness of conversation is preserved by giving priority to the side that talks first, or during transmitting, loudest. Because a high gain amplifier is incorporated in the level comparison circuit means 14, the time constant of circuit $R_{14}$, $C_4$ can be made smaller without worrying about cutting off word endings, so that it is possible for one party to interrupt the other quite easily and therefore to converse quite naturally by means of the speaker phone constructed in accordance with the present invention.

While specific embodiments of the invention have been disclosed, variations in procedural and structural detail within the scope of the appended claims are possible, and are contemplated. There is, therefore, no intention of limitation to the abstract, or the exact disclosure herein presented.

What is claimed is:

1. An electrical switching circuit comprising, in combination, input terminal means (2);

output terminal means (4);

at least two parallel electrical signal transmission paths between said input and output terminal means, said first path comprising a resistor (R15) and a normally conducting depletion type N channel field effect transistor (TR2) serially connected thereto, and said second path comprising a normally non-conducting bipolar NPN transistor (TR3);

means (R20, R21) for supplying a bias voltage to the drain of said field effect transistor and to the emitter of said NPN transistor, thereby simultaneously to establish said conducting and non-conducting states; and means for electrically supplying a gating signal to said transistors, which switches said NPN transistor to its conducting state when the magnitude of the gating signal exceeds said bias voltage, and which switches said field effect transistor into its non-conducting state when the magnitude of the gating signal is less than the bias voltage.

2. A telephone set comprising, in combination, a microphone; and means, including a transmitting amplifier, for supplying outgoing voice signals generated by said microphone to an office line;

a loudspeaker; and means including a receiving amplifier, for supplying incoming voice signals to said loudspeaker;

means, responsive to the respective magnitudes of the incoming and outgoing voice signals, for generating a control signal representative of the difference between said magnitudes;

first means for electrically connecting said microphone to said transmitting amplifier when said control signal at least equals a predetermined threshold voltage level, said first means comprising, in combination, input terminal means (2);

output terminal means (4);

at least two parallel electrical signal transmission paths between said input and output terminal means, said first path comprising a resistor (R15) and a normally conducting depletion type N channel field effect transistor (TR2) serially connected thereto, and said second path comprising a normally non-conducting bipolar NPN transistor (TR3); means for supplying said threshold voltage to the drain of said field effect transistor and to the emitter of said NPN transistor, thereby simultaneously to establish said conducting and non-conducting states; and means for electrically supplying said control signal to said transistors, thereby switching said NPN transistor to its conducting state when the magnitude of said control signal exceeds said threshold voltage, and switching said field effect transistor into its non-conducting state when the magnitude of said control signal is less than said threshold voltage; and second means, also responsive to said control signal, for electrically connecting the incoming voice signals to said receiving amplifier only when the magnitude of said control signal falls below said predetermined threshold voltage level.

3. The telephone set according to claim 2 wherein said second means includes input terminal means, output terminal means, at least one electrical signal transmission path therebetween, and means for electrically supplying said control signal to said transistor, said path comprising at least one transistor normally biased to a non-conduction state by said threshold voltage, and switching to a conduction state when the magnitude of said control signal is less than said threshold level.

4. The telephone set according to claim 3 wherein said control signal generating means includes means for deriving a positive d-c signal representative of the outgoing voice signal magnitude, and means for deriving a negative d-c signal representative of the incoming voice signal magnitude; means, including a signal summing network, for amplifying said d-c signals; and an R-C integrating circuit responsive to said amplified d-c signals for deriving said control signal.

* * * * *